US011589217B2

(12) United States Patent
Huffman et al.

(10) Patent No.: US 11,589,217 B2
(45) Date of Patent: *Feb. 21, 2023

(54) UPDATING SETTINGS OF A WIRELESS DEVICE BY EXCHANGING AUTHENTICATION AND CONFIGURATION INFORMATION VIA AN INDUCTIVE COUPLING LINK

(71) Applicant: Google LLC, Mountain View, CA (US)

(72) Inventors: Katherine Blair Huffman, Mountain View, CA (US); Kiavash Faraji, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,166

(22) Filed: Oct. 13, 2021

(65) Prior Publication Data

US 2022/0070662 A1 Mar. 3, 2022

Related U.S. Application Data

(63) Continuation of application No. 16/736,222, filed on Jan. 7, 2020, now Pat. No. 11,172,354.

(Continued)

(51) Int. Cl.
*H04W 8/24* (2009.01)
*H04W 12/06* (2021.01)
(Continued)

(52) U.S. Cl.
CPC ......... *H04W 8/245* (2013.01); *H04L 63/0853* (2013.01); *H04W 4/80* (2018.02); *H04W 12/06* (2013.01); *H04W 4/50* (2018.02)

(58) Field of Classification Search
CPC ..... H04W 4/02–06; H04W 4/50; H04W 4/70; H04W 4/80; H04W 16/18–20; H04L 63/0853
See application file for complete search history.

(56) References Cited

U.S. PATENT DOCUMENTS 9,009,805 B1 4/2015 Kirkby et al.
9,294,476 B1 3/2016 Lurey et al.
(Continued)

FOREIGN PATENT DOCUMENTS

EP 2602980 A1 6/2013
EP 2674011 A1 12/2013
WO 2012109286 A1 8/2012

OTHER PUBLICATIONS

Invitation to Pay Additional Fees and partial international search report for PCT Application No. PCT/US2020/057721 dated Feb. 11, 2021.

(Continued)

*Primary Examiner* — San Htun
(74) *Attorney, Agent, or Firm* — Botos Churchill IP Law

(57) ABSTRACT

A method and a system are provided for updating settings of a wireless device. An inductive coupling link is established between a first wireless device and a second wireless device upon detection that the first wireless device is within a threshold proximity to the second wireless device. The second wireless device receives a token from the first wireless device via the inductive coupling link. The second wireless device forwards the token to a remote device that stores a user profile associated with the user of the first wireless device. The second wireless device receives at least a portion of the user profile from the remote device in response to the token being forwarded. The second wireless device performs an update procedure to update one or more settings of the second wireless device in accordance with the received at least the portion of the user profile.

20 Claims, 5 Drawing Sheets

Related U.S. Application Data

(60) Provisional application No. 62/947,584, filed on Dec. 13, 2019.

(51) Int. Cl.
  *H04L 9/40* (2022.01)
  *H04W 4/80* (2018.01)
  *H04W 4/50* (2018.01)

(56) References Cited

U.S. PATENT DOCUMENTS

| | | | |
|---|---|---|---|
| 2013/0257364 A1* | 10/2013 | Redding | H02J 7/00047 320/108 |
| 2013/0268767 A1* | 10/2013 | Schrecker | G06F 21/31 713/185 |
| 2015/0271673 A1* | 9/2015 | Lord | H02J 50/90 455/411 |
| 2016/0094994 A1 | 3/2016 | Kirkby et al. | |
| 2016/0183056 A1 | 6/2016 | Leabman | |
| 2017/0091699 A1* | 3/2017 | Mueller | H04W 4/023 |
| 2019/0332787 A1 | 10/2019 | Graf et al. | |

OTHER PUBLICATIONS

Wireless Power Consortium, The Qi Wireless Power Transfer System, Power Class 0 Specification, Version 1.2.4 Addendum for Power Transmitter MP-A22, Sep. 2019.

"The International Search Report for PCT/US2020/057721 dated Apr. 1, 2021."

The First Office Action for Chinese Patent Application No. 202080078428.1, dated Dec. 16, 2022.

* cited by examiner

UPDATING SETTINGS OF A WIRELESS DEVICE BY EXCHANGING AUTHENTICATION AND CONFIGURATION INFORMATION VIA AN INDUCTIVE COUPLING LINK

CROSS-REFERENCE TO RELATED APPLICATIONS

This application is a continuation of U.S. patent application Ser. No. 16/736,222, filed Jan. 7, 2020, which claims the benefit of the filing date of U.S. Provisional Application No. 62/947,584, filed Dec. 13, 2019, the entire disclosures of which are incorporated by reference herein.

BACKGROUND

Typically, different communication devices using wireless technology such as Bluetooth, WiFi, and the like, are "paired" with each other before they can communicate. This involves making them discoverable and potentially entering a personal identification number (PIN) or password. The pairing process works with various profiles, and each device has to be compatible. For example, a mouse or keyboard may only be paired with a device that has been designed to work with that type of accessory. Even if an accessory and a device using the same technology are placed in proximity to each other, they may not be able to discover each other until placed in a discovery mode. A smartphone, tablet, or computer can be made to be discoverable. However, even though devices may be paired, it may be necessary for one of the devices to be authenticated by a remote device or other system. This can be challenging, and may require additional hardware or specific protocols that may delay access.

BRIEF SUMMARY

A user of a wireless device may encounter a situation where the user either forgotten or lost his or her wireless device, or the user's wireless device experiences a malfunction. In these situations, the user may need to use another wireless device in its place. Aspects of the technology provide for "low friction" authentication and data exchange for device setup through wireless charging hardware to be integrated into different user devices. This enables the user to have access to a temporary replacement device that replicates the same or equivalent settings as the user's original wireless device.

In accordance with one aspect, a method of updating settings of a wireless device is provided. An inductive coupling link is established between a first wireless device and a second wireless device upon detection that the first wireless device is within a threshold proximity to the second wireless device. The second wireless device receives a token from the first wireless device via the inductive coupling link, the token being associated with an authentication timeframe. The second wireless device forwards via a wireless link different from the inductive coupling link, the token to a remote device that stores a user profile associated with the user of the first wireless device, the token being forwarded by the second wireless device within the authentication timeframe. The second wireless device receives via the wireless link different from the inductive coupling link, at least a portion of the user profile from the remote device in response to the token being forwarded within the authentication timeframe. The second wireless device performs an update procedure to update one or more settings of the second wireless device in accordance with the received at least the portion of the user profile.

The second wireless device may further receive network connectivity information from the first wireless device via the inductive coupling link. The second wireless device may use the network connectivity information to forward the token to the remote device. The wireless link may be selected as either a WiFi link or a cellular link based on the network connectivity information. The first wireless device may be a cellphone and the second wireless device may be a portable computer. The second wireless device may forward at least a portion of the user profile to the first wireless device via the inductive coupling link. The at least the portion of the user profile may include application data. The inductive coupling link may be established by the second wireless device with the first wireless device when a coupling interface of the first wireless device is detected to be within a threshold proximity to a coupling interface of the second wireless device. The threshold proximity may be no more than 3 cm.

In accordance with another aspect, a wireless device may include a first interface, a second interface different from the first interface, and a processor operatively coupled to the first and second interfaces. The processor is configured to control the wireless device to establish an inductive coupling link with another wireless device via the first interface upon a determination that the wireless device is within a threshold proximity to the other wireless device, control the wireless device to receive a token via the inductive coupling link, the token being associated with an authentication timeframe, control the wireless device to forward, via a wireless link established by the second interface, the token to a remote device that stores a user profile associated with a user of the wireless device, wherein the token is forwarded within the authentication timeframe, control the wireless device to receive, via the second interface, at least a portion of the user profile from the remote device in response to the token being forwarded within the authentication timeframe, and perform an update procedure to update one or more settings of the wireless device in accordance with the received user profile.

DETAILED DESCRIPTION

Figure 1:
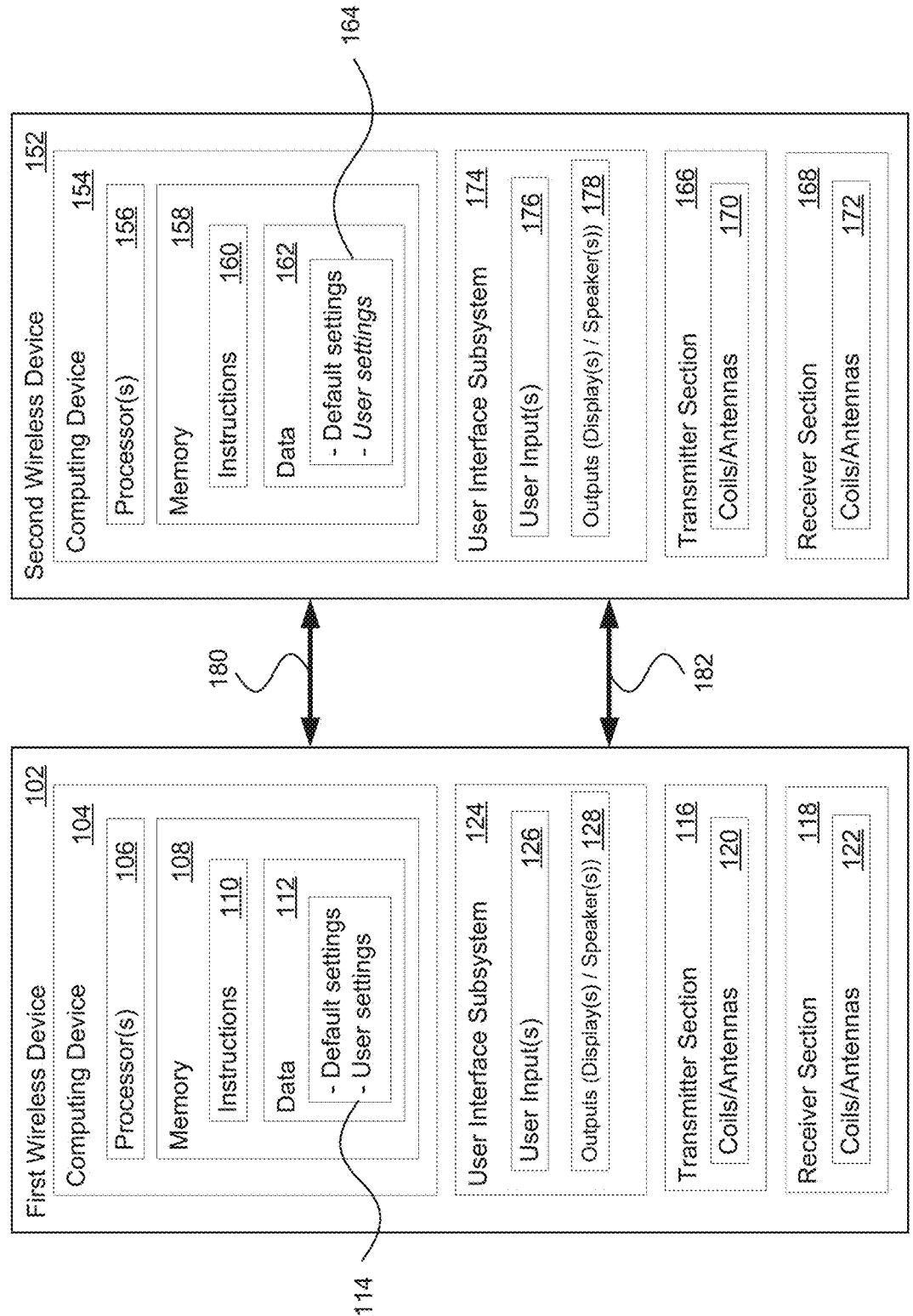
FIG. 1 illustrates first and second wireless devices communicating via an inductive coupling link in accordance with aspects of the technology.

A technical problem may result when a user of needs a temporary or permanent replacement for one of his or her devices. A technical solution would be to provide the user with access to another device, for instance as a loaner device or a new device. Technical advantages of the technology enable rapid device setup via "low friction" authentication and data exchange using wireless charging hardware integrated into different user devices. By way of example, in the loaner scenario, the technology beneficially provides the user with access to a temporary replacement device that replicates the same or equivalent settings as the user's original wireless device.

In one scenario, a user can set up a first device (e.g., a loaner device such as a laptop or tablet) with her/his profile information using an authorization provided by a second device (such as a mobile phone or a wearable device, e.g., a badge). Specifically, the second device is used to obtain authentication information (e.g., a one-time password (OTP)) from a remote system (e.g., an authentication server) via a communication link. The authentication information is passed to the first device via a contactless connection, such as, for example, an inductive charging connection. The first device can then use the authentication information to be set up with the user's profile information based on information received from the remote system.

The contactless connection may employ hardware and protocols set up in the first and second devices, for example as a contactless payment system. Such systems are configured to make secure payments when two devices are placed in close proximity to one another. Specifically, an embedded chip and antenna (e.g., a coil-type antenna) enable a user to wave their card, fob, or handheld device over a reader at a point of sale terminal. This is different than other types of systems, such as mobile payment arrangements that use broad-area cellular or WiFi networks and do not involve require physical proximity of the devices.

In one example, an architecture such as Qi™ (pronounced "CHEE" from the Chinese word qi) may be employed. Qi™ is an open interface standard that defines wireless power transfer using inductive charging over short distances of up to approximately 4 cm (1.6 inches), developed by the Wireless Power Consortium (WPC). A system using Qi™ may include a charging pad and a compatible device, which is placed on top of the pad. In particular, charging is performed via inductive coupling. This approach enables two different devices to interact with a limited amount of data transmission. Specifically, the devices may communicate to provide information about state of charge and the like. In this way, the mobile device can inform the base station when it is charged, etc. Instead of Qi™, another wireless power transfer mechanism enabling charging and data transfer via inductive coupling may be used.

In one example of a charging scenario, once an adjacent (second) device has been detected by a first device, the first device may validate it, specifically by sending a short (e.g., 8 bit) data string via the inductive link. The adjacent device responds, which may include providing signal strength information. The first device can then send multiple discrete pings to provide information about the optimum positioning of the second device. When the second device has been validated and the information been passed, charging commences. During the charging process, the first device sends control data packets to adjust the power level and finally terminate charging.

According to one aspect of the technology, identification of an adjacent (second) device occurs as a result of the detection of a change in capacitance or resonance of a transmitter coil by another (first) device, specifically using a contactless charging arrangement integrated into the device. As discussed further below, this identification and subsequent operations employ a multi-step spatial-temporal process to obtain authentication information by the first device for use by the second device. In one scenario, this can be employed for configuring a user profile, which may include application data, or other information on the second device efficiently and without requiring the user to enter any personal information.

By way of example, a user may set up at least one user profile, which is stored in a database of a server or otherwise accessible by the server. In this example, a wireless telephone or other personal communication device, currently being used by the user, is associated with the user profile. The wireless telephone is able to connect to a network, (e.g., via a WiFi or a cellular connection) and communicate with the server. When the wireless telephone is spatially placed in close (threshold) proximity with another device, such as a laptop or tablet computer (e.g., within 1-3 or 1-4 cm or less of an inductive charging link) that needs to be set up in accordance with the laptop computer and the wireless telephone, the wireless telephone requests, via the WiFi or the cellular link, that the server issue a token. The token is only valid temporally for a short period of time (e.g., 5-30 seconds). Because the wireless telephone and the laptop computer are within immediate spatial proximity and the token has a very short lifetime, this greatly enhances security for token sharing.

Continuing the example, the wireless telephone receives the token from the server via the WiFi or cellular network (indicating the user's identity) and provides the token to the laptop computer via the wireless charging link. The laptop computer then forwards the token to the server via a different type of communication link from the wireless charging link, such as a WiFi or a cellular connection separate from the connection used by the wireless telephone. Upon authentication of the token by the server, the server sends the user profile to the laptop via this communication link. Upon receipt of the user profile from the server, the laptop computer then performs an update procedure to update its settings in accordance with the user's profile. This can include modifying default system settings in accordance with the user's profile. By way of example, the update may modify font or other display settings, audio settings such as notification tone or volume, default browser or other application settings, etc. For instance, many different aspects and settings including application data may be backed up and stored by an operating system or application. By way of example, this information can include access to different WiFi links, display brightness or other settings, and can also involve initiating the downloading of relevant documents/apps (e.g., to prerender a web page).

Specifically, a user can set up a second device (e.g., a loaner or replacement device such as a laptop or tablet) with her/his profile information using authorization provided by a first device (such as a mobile phone or a wearable device (e.g., a badge)). The first device is used to obtain authentication information (e.g., a one-time password (OTP)) from the network, which is passed to the second device via a contactless charging connection. The second device can then use the authentication information to be set up with the user's profile information based on information received from the network.

As shown in system 100 of FIG. 1, a first wireless device 102 includes a computing device 104 having one or more processors 106 and a memory 108, as well as other components typically present in general purpose computing devices. The memory 108 stores information accessible by the one or more processors 106, including instructions 110 and data 112 that may be executed or otherwise used by the one or more processors 106. The memory 108 may be of any type capable of storing information accessible by the processor, including a computing device-readable medium. The memory is a non-transitory medium such as a hard-drive, memory card, optical disk, solid-state, or other non-transitory medium. The device 102 may include different combinations of the foregoing, whereby different portions of the instructions and data are stored on different types of media.

The instructions 110 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The data 112 may be retrieved, stored or modified by the one or more processors 106 in accordance with the instructions 110. As illustrated in FIG. 1, the data 112 may include setting information 114, such as default settings for operation of the system and applications, as well as user settings that may be associated with one or more user profiles.

The one or more processors 106 may be any conventional processors, such as commercially available CPUs. Alternatively, the one or more processors may be a dedicated device such as an application-specific integrated circuit (ASIC) or other hardware-based processor. Although FIG. 1 functionally illustrates the processor(s), memory, and other elements of computing device 104 as being within the same block, such devices may actually include multiple processors, computing devices, or memories that may or may not be co-located. Similarly, the memory 108 may be a hard drive or other storage media located on a circuit board or other housing different from that of the one or more processors 106. Accordingly, references to a processor or computing device will be understood to include references to a collection of processors or computing devices or memories that may be distributed and may or may not operate in parallel.

FIG. 1 shows that the first wireless device 102 also includes a communication section comprising a transmitter section 116 including one or more transmitters and a receiver section 118 including one or more receivers. The transmitter section 116 and the receiver section 118 include modules for transmitting and receiving information wirelessly and optionally via a wired connection, specifically on the transmit side by modulating and upconverting a baseband signal to a selected frequency for transmission, and on the receive side by downconverting from the selected frequency and demodulating to a corresponding baseband signal. This may include using short range communication protocols such as Bluetooth™, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. While shown separately, the transmitter section 116 and the receiver section 118 may be part of or otherwise operate as a single transceiver module.

As shown, the transmitter section 116 includes a set of coils/antennas 120, and the receiver section also includes a set of coils/antennas 122. In some configurations the coils/antennas 120 may be the same as the coils/antennas 122 (i.e., the same coils/antennas are used for transmission and reception), while in other configurations they may be different. These components are selected, e.g., based on the frequencies used for communication. At least one of the coils 120/122 may be configured to perform power charging functions and support the transfer of data via inductive coupling. In one example, at least one of the coils 120/122 may be configured in accordance with the Qi™ standard. Alternatively, at least one of the coils 120/122 may be configured in accordance with other inductive coupling power sharing implementations.

The first wireless device 102 may include all of the components normally used in connection with a computing device such as the processor and memory described above as well as a user interface subsystem 124. The user interface subsystem 124 may include one or more user inputs 126 (e.g., a mouse, keyboard, touch screen and/or microphone) and various outputs 128, such as electronic displays (e.g., a monitor having a screen or any other electrical device that is operable to display information), one or more speakers and/or haptic outputs.

Further, as shown in FIG. 1, a second wireless device 152 includes a computing device 154 having one or more processors 156 and a memory 158, as well as other components typically present in general purpose computing devices. The memory 158 stores information accessible by the one or more processors 156, including instructions 160 and data 162 that may be executed or otherwise used by the one or more processors 156. The one or more processors 156 and the memory 158 may be the same or equivalent to the one or more processors 106 and the memory 108 described above. The data 162 may include setting information 164, such as default settings for operation of the system and applications. It may be updated with user settings that may be associated with one or more user profiles, specifically based upon settings associated with the user of the first wireless device 102.

FIG. 1 shows that the second wireless device 152 also includes a communication section comprising a transmitter section 166 and a receiver section 168. As described above with regard to the first wireless device 102, the transmitter section 166 and the receiver section 168 include modules for transmitting and receiving information wirelessly and optionally via a wired connection, and may be part of or otherwise operate as a single transceiver module.

As shown in FIG. 1, the transmitter section 166 includes a set of coils/antennas 170, and the receiver section 168 also includes a set of coils/antennas 172. In some configurations the coils/antennas 170 may be the same as the coils/antennas 172 (i.e., the same coils/antennas are used for transmission and reception), while in other configurations they may be different. These components are selected, e.g., based on the frequencies used for communication. At least one coil 170/172 is configured to perform power charging functions and support the transfer of data via inductive coupling. In one example, at least one of the coils 170/172 may be configured in accordance with the Qi™ standard. Alternatively, at least one of the coil 170/172 may be configured in accordance with other inductive coupling power sharing implementations.

And similar to the first wireless device 102, the second wireless device 152 may include all of the components normally used in connection with a computing device such as the processor and memory described above as well as a user interface subsystem 174. The user interface subsystem 174 may include one or more user inputs 176 (e.g., a mouse, keyboard, touch screen and/or microphone) and various outputs 178, such as electronic displays (e.g., a monitor having a screen or any other electrical device that is operable to display information), one or more speakers and/or haptic outputs.

As shown in FIG. 1, the first wireless device 102 and the second wireless device 152 are configured to communicate via an inductive coupling link 180 via coils 120/170. The first wireless device 102 and the second wireless device 152 may also provide power to one another via the same coils 120/170. Optionally, the first wireless device 102 and the second wireless device 152 may communicate with one another via a wireless (or wired) link 182. By way of example, the link 182 may be a Bluetooth™, WiFi, cellular or near field communication (NFC) link, or may comprise one or more such links.

As an example, the first wireless device 102 may be a wireless telephone, and the second wireless device 152 may be a laptop, tablet or netbook-type computer, a wearable device, personal digital assistant or another wireless telephone. The memories 108 and 158 may be used to store various parameters used by the receiver and transmitters to perform their associated functions, as well as information received from another device. The processors 106 and 156 may be configured to detect a change in capacitance or resonance of one or more of the coils, indicating whether the inductive coupling link 180 has been established between the first wireless device 102 and the second wireless device 152.

Figure 2A:
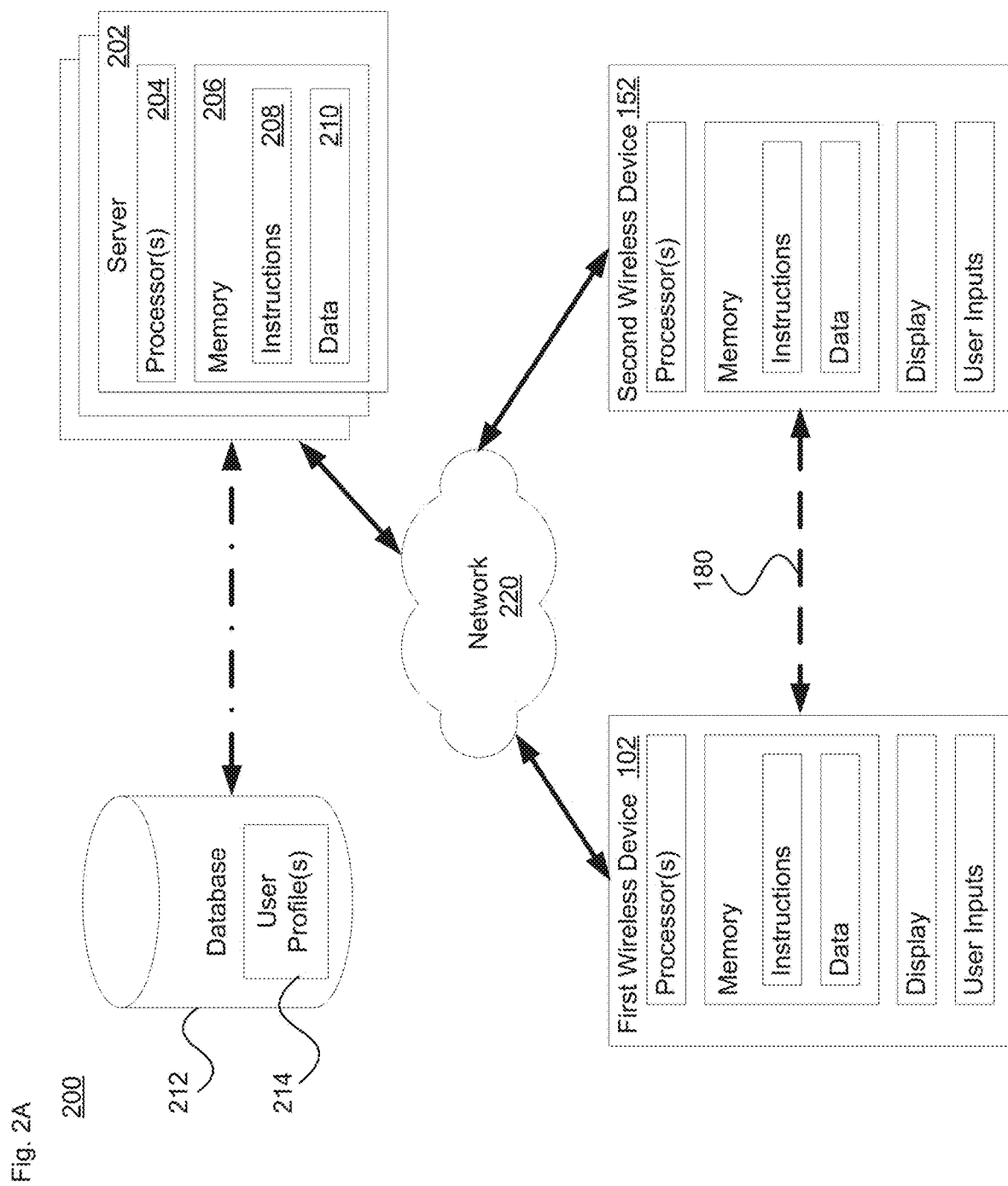
FIGS. 2A-B illustrates a system including the first and second wireless devices of FIG. 1 in accordance with aspects of the technology.

FIG. 2A illustrates a system 200 including the first wireless device 102, the second wireless device 152, and a server (i.e., a remote device) 202 configured for communication with the first wireless device 102 and the second wireless device 152 via a network 220, as shown by the solid lines with double arrows. As shown in FIG. 2A, the server 202 includes one or more processors 204 and a memory 206 storing instructions 208 and data 210. These components may be the same or equivalent to those described above with regard to FIG. 1. In one example, the server 202 may include one or more server computing devices having a plurality of computing devices, that exchange information with different nodes of the network 220 for the purpose of receiving, processing and transmitting the data to and from other computing devices. The first wireless device 102 and the second wireless device 152 are configured to communicate directly with each other via the inductive coupling link 180.

As shown in FIG. 2A, a database 212 stores at least one user profile 214. The database 212 may be separate from or part of the memory 206. In the former case, the server 202 and the database 212 may communicate directly or indirectly, as shown by the dash-dot line. The user of the first wireless device 102 may set up the at least one user profile 214 that is stored in the database 212 associated with the server 202. The first wireless device 102 may thus be associated with the at least one user profile 214.

Figure 2B:
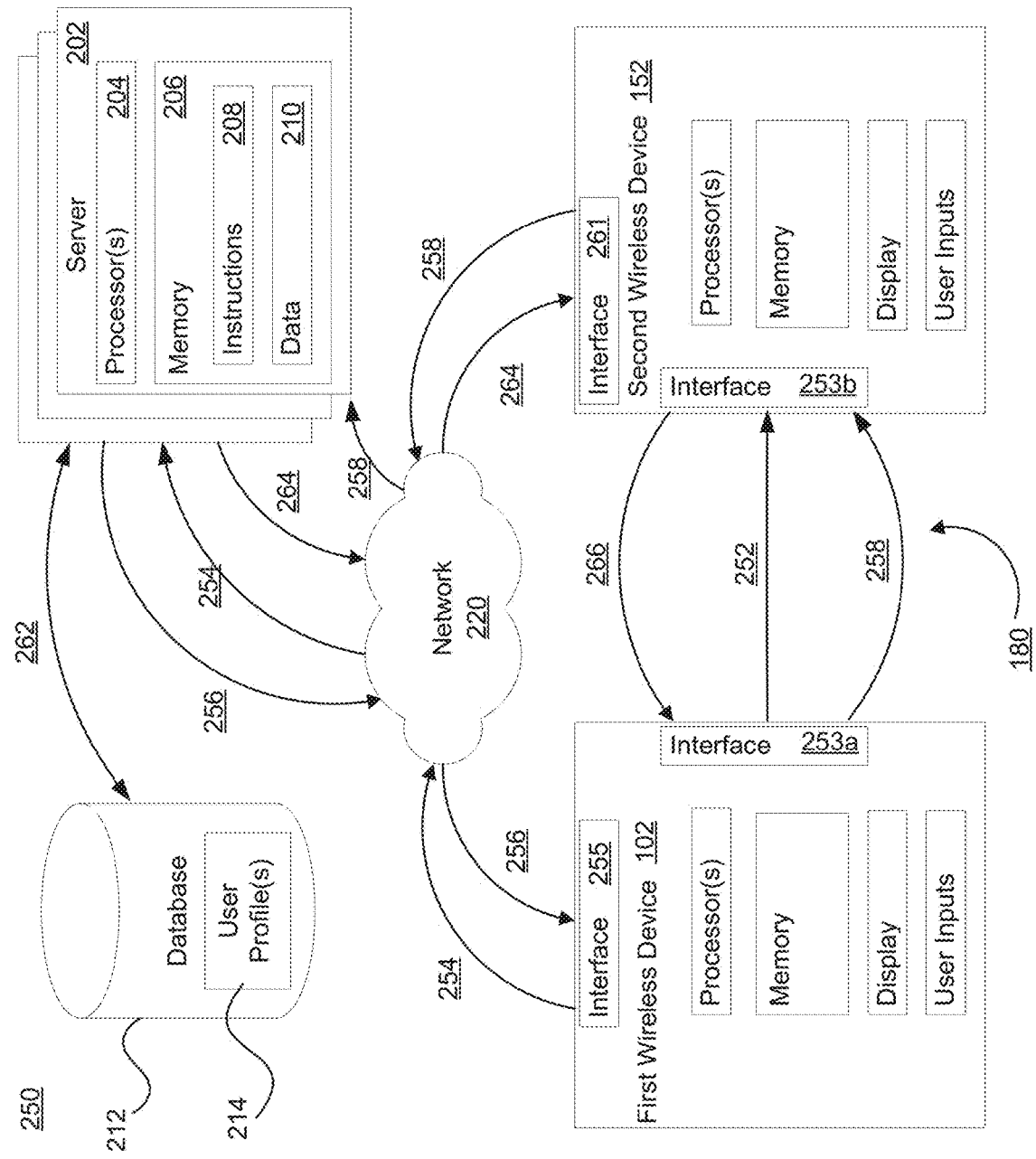

FIG. 2B illustrates an exemplary information flow between the first wireless device 102, the second wireless device 152 and the server 202. Referring to FIGS. 1 and 2B, when the first wireless device 102 is placed in a threshold proximity with the second wireless device 152 (e.g., within ~1-3 or 1-4 cm or less), the processor 106 in first wireless device 102 and/or the processor 156 in the second wireless device 152 is configured to detect the establishment of the inductive coupling link 180 created by the coils 120 and 122 and, in response, may transmit network connectivity information 252, such as a service set identifier (SSID) and a password, to the second wireless device 152 via an interface 253a of the first wireless device 102, a coupling interface 253b of the second wireless device 152 and the inductive coupling link 180. Further, in response to the establishment of the inductive coupling link 180, the first wireless device 102 transmits a token request message 254 to the server 202, via a network interface 255 of the first wireless device 102 and the network 220 (e.g., using a WiFi or cellular communication link). Maintaining the short distance between the first wireless device 102 and the second wireless device 152 for a continuous inductive coupling link not only ensures the integrity of the inductive coupling link 180, but also enhances security. Otherwise, an error message or indicator may be issued by the processor(s) of the first and/or second wireless devices indicating that the inductive coupling link is not currently established or has been disrupted.

In response to the token request message 254, the server 202 may authenticate the request and issue a token response message 256 (indicating the user's identity) to the first wireless device 102 via the network 220 and the network interface 255 of the first wireless device 102. The token response message 256 is only valid for a short period of time, such as 1-20 seconds, no more than 1 minute, or a similar timeframe. Thus, the first wireless device 102 needs to quickly forward a token 258 included in the token response message 256 to the second wireless device 152 via the coupling interface 253a, the inductive coupling link 180 and the coupling interface 253b before it expires.

Still referring to FIG. 2B, by using the network connectivity information 252 received from the first wireless device 102, the second wireless device 152 then forwards the token 258 to the server 202 via a network interface 261 of the second wireless device 152 and the network 260 (e.g., using a WiFi or cellular communication link). The token 158 may be validated, specifically by comparing the information in the token 258 to the token information of the token response message 256. In response to the token 258 (e.g., upon validation), the server 202 may communicate with the database 212 via link 262 to retrieve the at least one user profile 214. The server 202 then transmits a user profile message 264 including the at least one user profile 214 to the second wireless device 152 via the network 260 and the network interface 261 of the second wireless device 152. The second wireless device 152 may then perform an update procedure to update its settings in accordance with the at least one user profile 214, specifically by modifying one or more user, application or operating system settings. The second wireless device 152 may also pass certain information 266 including the at least one user profile 214 to the first wireless device 102 via the inductive coupling link 180, specifically so that the profile settings of the first wireless device 102 may also be updated.

Figure 3:
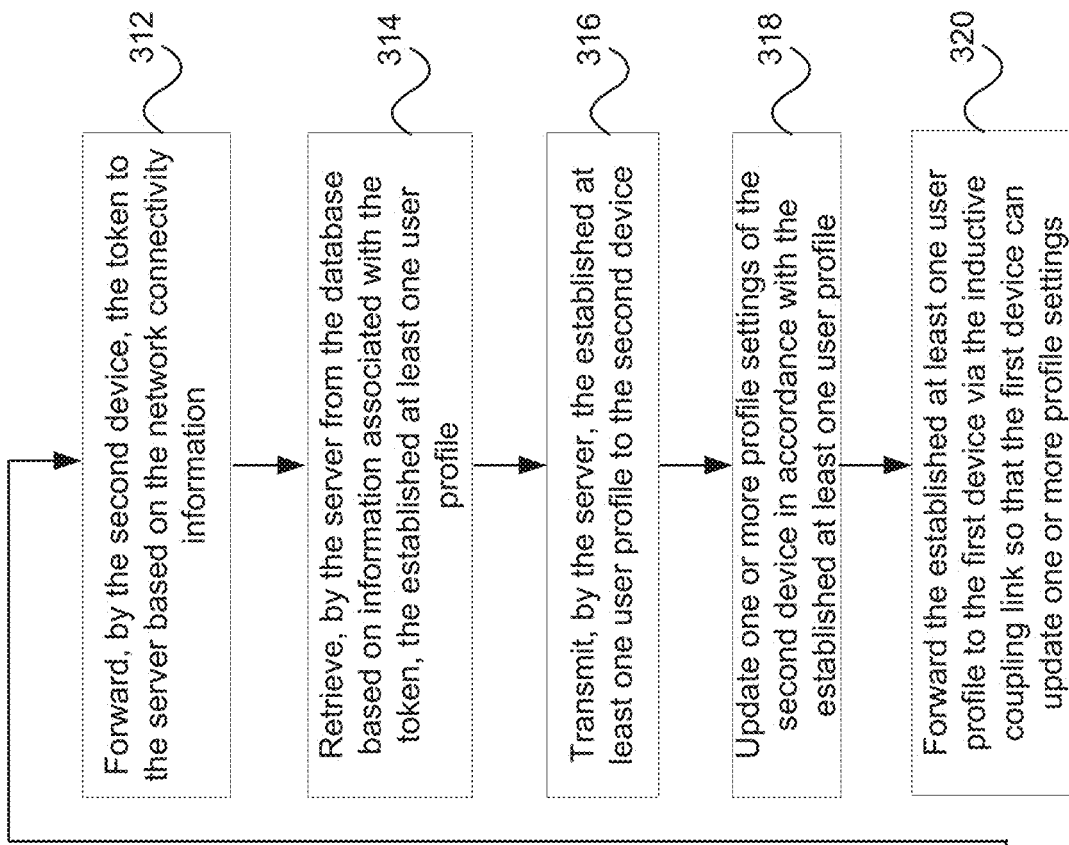
FIG. 3 illustrates a method for updating settings of a wireless device by exchanging authentication and configuration information via an inductive coupling link in accordance with aspects of the technology.
Figure 3:
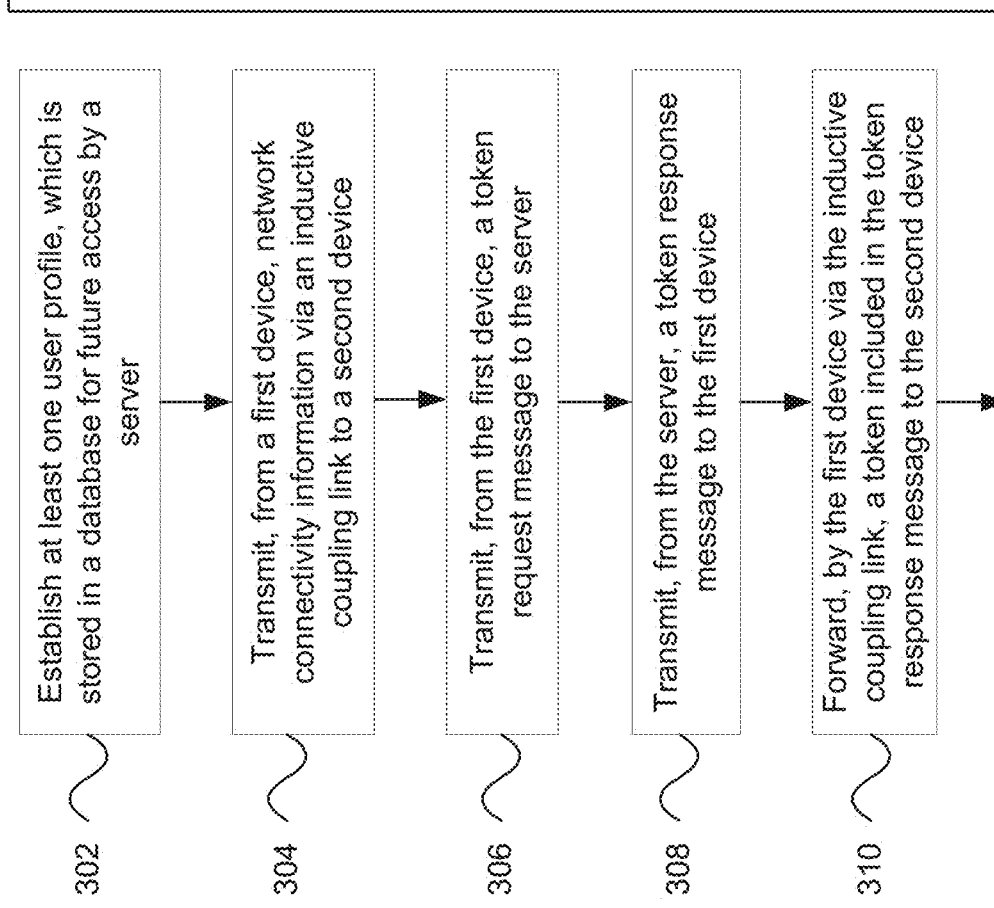

FIG. 3 illustrates a method 300 for updating settings of a wireless device by exchanging authentication and configuration information via the inductive coupling link 180 described above. Referring to FIGS. 1, 2A, 2B and 3, in preparation for a situation where a user of the second wireless device 152 may need a loaner or replacement device, he or she may establish the at least one user profile 214, which is stored in the database 214 for future access, as shown by block 302 of FIG. 3. The second wireless device 152 may be associated with the at least one user profile 214 as discussed below. As shown by block 304 of FIG. 3, when the first wireless device 102 is placed in a close threshold proximity with the second wireless device 152 (e.g., within about 1-4 cm or less) and the inductive coupling link 180 is established, the first wireless device 102 may transmit network connectivity information 252, such as a SSID and/or a password, to the second wireless device 152 via the inductive coupling link 180.

Still referring to FIGS. 1, 2A, 2B and 3, in block 306 of FIG. 3, the first wireless device 102 transmits a token request message 254 to the server 202 via the network 260. Maintaining the short distance between the first wireless device 102 and the second wireless device 152 during this time not only ensures the integrity of the inductive coupling link 180, but also enhances security. In response, as shown in block 308 of FIG. 3, the server 202 issues a token response message 256 to the first wireless device 102 via the network, which is only valid for a short period of time. For example, the token response message may remain valid for only 1-20 seconds, no more than 1 minute, or a similar timeframe. Thus, in block 310 of FIG. 3, the first wireless device 102 needs to quickly forward a token 258 included in the token response message 256 to the second wireless device 152 via the coupling interface 253a, the inductive coupling link 180 and the coupling interface 253b before it expires.

Still referring to FIGS. 1, 2A, 2B and 3, in block 312 of FIG. 3, the second wireless device 152, using the network connectivity information 252 received from the first wireless device 102, then forwards the token 258 to the server 202 via the network 220. In response, at block 314 of FIG. 3, the server 202 retrieves the at least one user profile 214 based on information associated with the token 258. As a result, in block 316 of FIG. 3, the server 202 transmits the user profile message 264 including the at least one user profile 214 to the second wireless device 152 via the network 220. At block 318, the second wireless device 152 then performs an update procedure to update its settings in accordance with the at least one user profile 214. Optionally, at block 320 the second wireless device 152 may forward the at least one user profile 214 to the first wireless device 102 via the inductive coupling link 180 (or another link) so that that the first user wireless device may update the profile settings of the first wireless device.

Figure 4:
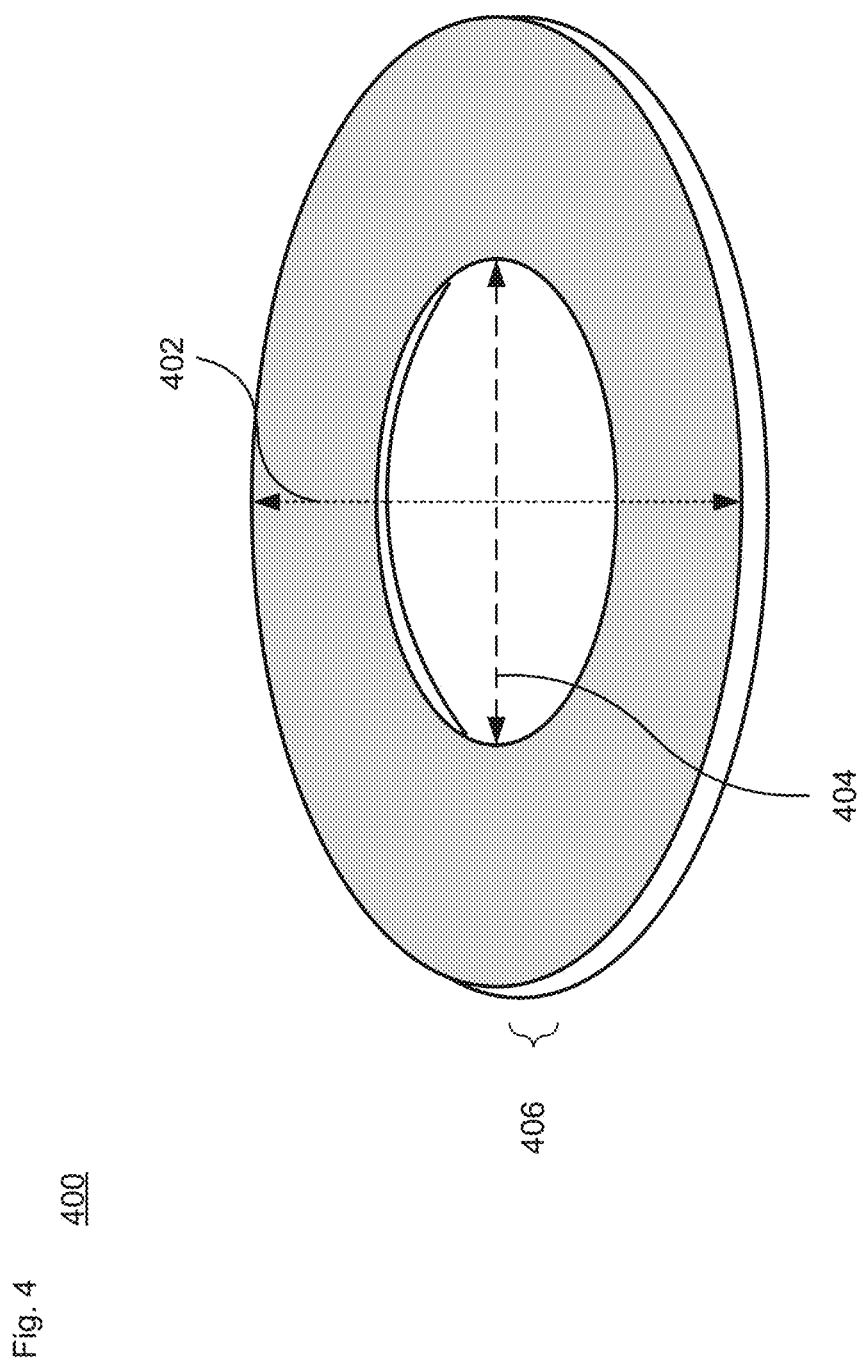
FIG. 4 illustrates an example of a coil used to establish an inductive coupling link in accordance with aspects of the technology.

FIG. 4 shows an example 400 of a coil-type device that may be used to establish the inductive coupling link in accordance with aspects of the technology. In one example, the coil may be a wire-wound type and be formed using No. 17 AWG (e.g., on the order of 1.15 mm diameter) type 2 Litz wire having between 100-110 strands of No. 40 AWG (e.g., on the order of 0.08 mm diameter), or equivalent. As shown in example 400 of FIG. 4, the coil may have a generally circular shape and have one or two layers. For example, the coil shown in FIG. 4 may have an outer length 402 (diameter $d_0$) of, e.g., 44.0±1.5 mm, an inner length 404 (diameter $d_1$) of, e.g., 20.5±0.5 mm, and a thickness 406 ($d_c$) of, e.g., 2.1±0.5 mm. In this example, the coil may have approximately 10 (5 bifilar) turns per layer and may have 1 or 2 layers. In other examples, different coil arrangements may be provided, for instance depending on the types of computing devices they will be used in, including any physical size constraints.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the aspects should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible aspects. Further, the same reference numbers in different drawings can identify the same or similar elements.

The invention claimed is:

1. A method of updating settings of a wireless device, the method comprising:
   upon detection that a first wireless device is within a threshold proximity to a second wireless device, receiving by the second wireless device, a token from the first wireless device, the token having been issued to the first wireless device by a remote server device, the token being associated with a user of the first wireless device and being valid for a specific timeframe;
   upon receiving the token from the first wireless device, forwarding, by the second wireless device, the token to the remote server device, the token being forwarded by the second wireless device within the specific timeframe;
   receiving, by the second wireless device, at least a portion of a user profile from the remote server device, the user profile being associated with the user of the first wireless device; and
   performing, by the second wireless device, an update procedure to update one or more settings of the second wireless device in accordance with the received at least the portion of the user profile.

2. The method of claim 1, wherein the token is received by the second wireless device via a first link and the token is forwarded to the remote server via a second link distinct from the first link.

3. The method of claim 2, wherein the first link is an inductive coupling link.

4. The method of claim 3, wherein the second link is a wireless ad hoc link.

5. The method of claim 1, further comprising:
   upon the detection that the first wireless device is within the threshold proximity to a second wireless device, issuing a token request by the second wireless device to the first wireless device.

6. The method of claim 1, wherein the threshold proximity is no greater than 4 cm.

7. The method of claim 1, wherein the one or more settings are one or more user settings associated with the user.

8. The method of claim 7, wherein performing the update procedure to update the one or more user settings includes updating at least a display setting or an audio setting.

9. The method of claim 1, wherein performing the update procedure to update the one or more settings includes updating an application setting of the second wireless device.

10. The method of claim 1, wherein performing the update procedure to update the one or more settings includes updating an operating system setting of the second wireless device.

11. The method of claim 1, further comprising:
    receiving, by the second wireless device, connectivity information from the first wireless device;
    wherein forwarding the token to the remote server device is done using the connectivity information received from the first wireless device.

12. The method of claim 11, wherein the connectivity information includes a service set identifier of a wireless network.

13. The method of claim 1, further comprising forwarding, by the second wireless device, the at least the portion of the user profile to the first wireless device.

14. The method of claim 13, wherein the at least the portion of the user profile is forwarded to the first wireless device via an inductive coupling link established between the first and second wireless devices.

15. A method comprising:
   upon detection that a first wireless device is within a threshold proximity to a second wireless device, requesting by the first wireless device a token from a remote server device, the token being associated with a user of the first wireless device and being valid for a specific timeframe, and wherein a user profile associated with the user of the first wireless device is accessible by the remote server;
   receiving, by the first wireless device, the token from the remote server device; and
   forwarding, by the first wireless device within the specific timeframe, the token to the second wireless device for use in obtaining at least a portion of the user profile from the remote server device in order to update one or more settings of the second wireless device with the server during the specific timeframe.

16. The method of claim 1, wherein the token is requested by the first wireless device via a first link and the token is forwarded to the second wireless device via a second link distinct from the first link.

17. The method of claim 16, wherein the second link is an inductive coupling link established upon the first wireless device being within the threshold proximity to the second wireless device.

18. The method of claim 17, wherein the first link is a wireless link.

19. The method of claim 15, further comprising:
   receiving, by the first wireless device, user profile data from the second wireless device; and
   updating, by the first wireless device, one or more settings of the first wireless device based on the received user profile data.

20. A method comprising:
   receiving, by a server device, a request from a first wireless device for a token upon detection that a first wireless device is within a threshold proximity to a second wireless device, the token being associated with a user of the first wireless device, and wherein a user profile associated with the user of the first wireless device is accessible by the remote server;
   authenticating, by the server device, the request for the token;
   upon authenticating the request, the server device issuing a token response message to the first wireless device, the token response message including the token that is valid for a specific timeframe;
   receiving, by the server device from the second wireless device, the token within the specific timeframe;
   validating, by the server device, the token received from the second wireless device;
   upon validating the token, the server device retrieving at least a portion of the user profile associated with the user of the first wireless device; and
   transmitting, by the server device, the at least the portion of the user profile to the second wireless device to enable the second wireless device to perform an update procedure to update one or more settings of the second wireless device in accordance with the at least the portion of the user profile.

* * * * *

UNITED STATES PATENT AND TRADEMARK OFFICE
CERTIFICATE OF CORRECTION

| | | |
|---|---|---|
| PATENT NO. | : 11,589,217 B2 | |
| APPLICATION NO. | : 17/500166 | |
| DATED | : February 21, 2023 | |
| INVENTOR(S) | : Katherine Blair Huffman et al. | |

It is certified that error appears in the above-identified patent and that said Letters Patent is hereby corrected as shown below:

In the Claims

Claim 20, Column 12, Line 14:
Now reads: "remote server"; should read -- server device --

Signed and Sealed this
Eleventh Day of April, 2023

Katherine Kelly Vidal
*Director of the United States Patent and Trademark Office*